United States Patent [19]

D'Auria

[11] Patent Number: 5,140,137

[45] Date of Patent: Aug. 18, 1992

[54] ELECTRO-WELDING SLEEVE FABRICATION METHOD, DEVICE FOR IMPLEMENTING IT AND SLEEVES OBTAINED BY THE METHOD

[75] Inventor: Vincent S. B. D'Auria, Cap d'Ail, France

[73] Assignee: Boulet d'Auria, Terlizzi & Cie and Gaz de France, Monaco, France

[21] Appl. No.: 532,450

[22] Filed: Jun. 4, 1990

[30] Foreign Application Priority Data

Jun. 9, 1989 [FR] France ............................. 89 07647

[51] Int. Cl.[5] ..................... H05B 3/06; B29C 65/34
[52] U.S. Cl. ........................... 219/535; 264/272.11; 264/272.15; 264/272.18; 219/544; 219/548
[58] Field of Search ............. 219/535, 548, 517, 544, 219/549, 528, 541, 522; 285/22, 286, 21, 381, 423; 264/272.11, 149, 150, 173, 209.2, 27, 154, 272.15, 272.18, 310; 425/112, 114, 174, 174.6

[56] References Cited

U.S. PATENT DOCUMENTS 4,266,997 5/1981 Lippera .......................... 156/158
4,530,520 7/1985 Nyffeler et al. ................ 219/544

FOREIGN PATENT DOCUMENTS 0002799 7/1979 European Pat. Off. .
0055891 7/1982 European Pat. Off. .
0086359 8/1983 European Pat. Off. .
0119738 9/1984 European Pat. Off. .
0262735 4/1988 European Pat. Off. .
0303909 2/1989 European Pat. Off. .
2186114 1/1974 France .
WO8200699 3/1982 PCT Int'l Appl. .
483771 2/1970 Switzerland .

*Primary Examiner*—Bruce A. Reynolds
*Assistant Examiner*—Michael D. Switzer
*Attorney, Agent, or Firm*—Andrus, Sceales, Starke & Sawall

[57] ABSTRACT

In a method of manufacturing a plastics material sleeve fitted with a heating wire and intended for producing an electric resistance welding connector the sleeve is molded to a cylindrical shape delimited by an outside surface and an inside surface; a helical groove is formed in one of these two surfaces of the sleeve; a wire is placed in the groove; and the plastics material heated by means of the wire is smoothed so as to cover the wire totally and close the groove. The electric resistance welding sleeve obtained in this way is in particular intended to be used either without overmolding it as an ordinary sleeve in particular for welding water pipes or after overmolding it as an electric resistance welding connector in particular for gas pipes.

3 Claims, 3 Drawing Sheets

ELECTRO-WELDING SLEEVE FABRICATION METHOD, DEVICE FOR IMPLEMENTING IT AND SLEEVES OBTAINED BY THE METHOD

BACKGROUND OF THE INVENTION

1. Field of the Invention

The present invention concerns a method of fabricating electric resistance welding sleeves, a device for implementing it and preferred applications of the sleeve produced in this way.

2. Description of the Prior Art

Electric resistance welding sleeves are used in particular for jointing plastics material tubular elements such as gas or water distribution pipes usually made from polyethylene.

The electric resistance welding technique consists in using a heating wire embedded in a connecting part and forming an electrical resistance to heat the contacting surfaces of the parts to the temperature at which the materials weld.

The usual technique employed for forming such connecting parts (or connectors) is overmolding by injection molding. The heating wire is placed in a spool which is overmolded to form the connecting part. The wire is therefore relatively near the inside surface of the element. To achieve good quality welding it is desirable for the wire to be as near as possible to this inside contact surface.

One way to fabricate an electric resistance welding sleeve is known from French patent application FR-B-2.221.679 (STURM VON ROLL AG), by forming a groove in the outside surface of a plastics material sleeve and winding the resistance wire under tension into the resulting groove on the sleeve. When finished, the sleeve is expanded by means of a spreader mandrel and this subjects the heating wire to an additional longitudinal tension stress. The sleeve is then surrounded by an outer sleeve element in an injection mold. The major disadvantage of a method of this kind is the risk of displacement and expansion of the heating wire before and during overmolding.

Before it is overmolded the wire is held in place on the surface of the spool only by the tension in it. This tension may not be correct, for example because of an operator error during winding or during storage because of a variation in the diameter of the sleeve due to ambient atmospheric conditions, in particular excessive relative humidity.

It is also difficult to regulate the tension to be applied to the wire as it is wound onto the sleeve. The wire must be firmly tensioned so that it is securely accommodated in the bottom of the helical groove. However, the wire must not be overtensioned because in this case its diameter is reduced and the final resistivity obtained is higher than that required, which has disadvantages at welding time.

The wire may also be displaced during overmolding by the forces due to the viscosity of the overmolded plastics material.

Any such displacements lead to non-homogeneous dispersion of heat, compromising the quality of the weld. There is also the risk of air pockets being created in the connecting part, which are also detrimental to the weld.

What is more, in a method of this kind there is obviously a minimum distance between the wire and the inside surface of the sleeve that cannot be eliminated and it is therefore impossible to have the wire tangential to the inside surface of the sleeve, among other things.

Finally, with sleeves of this kind storage is a problem because the wire and the groove in the sleeve are exposed to the ordinary atmosphere of the workshop so that contamination by polluted air and soiling by dust or the like leads to the necessity to clean them before carrying out the overmolding.

European patent EP-A-303 909 (GLYNWED TUBES AND FITTINGS LIMITED) proposes a method of fabricating an electric resistance welding connector in which a heated wire is wound onto a sleeve. The temperature of the wire softens the plastics material near the wire. A pressure roller transmits to the wire sufficient pressure to embed it in the plastics material, so that the wire is eventually entirely covered with plastics material. The connector is then obtained by overmolding this sleeve in the conventional way.

This method has various disadvantages.

Guiding the wire onto the surface of the sleeve in a helix can only be achieved by translation of the sleeve or of the heating head during rotation of the sleeve. An incorrect wire tension or incorrect adjustment of the tooling can lead to unwanted variation in the pitch of the helix which is detrimental to the homogeneity of the weld and creates a risk of short-circuiting.

Also, the heating wire is installed near the outer surface of the sleeve and may even be flush with it. As explained above, it is at the inside surface of the sleeve that the plastics material of the sleeve and the tubular elements to be jointed must be heated to achieve the optimum weld.

Finally, there is some uncertainty as to the reliability of this method. The pressure roller smooths the plastics material over the wire to only a limited degree and irregularities in the anchoring of the wire may result, possibly even total absence of anchoring at some locations on the surface of the sleeve.

Generally speaking, the methods described in these two prior art documents systematically require overmolding of the sleeve to produce the electric resistance welding connector.

In both cases if there were no overmolding the heating of the wire would destroy the sleeve. This is because of the absence of any continuous external structure in the document FR-A-2 221 679 and because of the reduced thickness of the sleeve and the external disposition of the wire in the document EP-A-0303 909.

European patent application EP-A-0.086.359 proposes to form a helical groove in the inside cylindrical surface of a plastics material sleeve fabricated beforehand, for example by molding. The groove is formed in the cylindrical inside surface by a rotating cutting head fitted with a cutter.

The heating wire is then introduced into the groove formed in this way and freely placed in the bottom of the groove, which is finally partly closed by pressing the surrounding plastics material.

In this cited document the radial position of the wire relative to the cylindrical inside surface is not specified and it is possible that the wire is not held totally against the bottom of the groove. Also, the method described is such that part of the external surface of the wire is not covered by any coating material which makes it impossible to produce a sleeve in which the heating wire is flush with the cylindrical inside surface. Storing a sleeve produced in this way poses problems because the wire remains exposed to the ordinary atmosphere of the shop and contamination by polluted air may make it necessary to clean the sleeve before it is used for welding.

The fitting of the heating wire into an internal groove by smoothing the plastics material so as to surround it only partially prevents effective control over the anchoring of the wire into the plastics material during winding and at the end of the smoothing operation.

An object of the present invention is to remedy these disadvantages and to fabricate an electric resistance welding sleeve that can be used on its own, without overmolding, for example as an electric resistance welding sleeve for routine use, in particular for welding water pipes, or, after overmolding, as an electric resistance welding connector, in particular for gas pipes.

SUMMARY OF THE INVENTION

The invention consists in a method of fabricating a plastics material sleeve provided with a heating wire and intended for producing an electric resistance welding connector, in which method:

the sleeve is molded to a cylindrical shape delimited by an outside surface and an inside surface;

a helical groove is formed in one of these two surfaces of the sleeve;

a wire is placed in the groove;

the plastics material is smoothed to at least partially surround the wire;

the helical groove is formed in the cylindrical outside surface of the sleeve;

the wire is heated before it is placed in the bottom of the groove; and the plastics material heated by means of the wire is smoothed so as to cover the wire totally and close the groove.

To achieve this, the present invention specifies the molding of a plastics material sleeve, the formation of a helical groove, the placing in the bottom of this groove of a heated wire which therefore becomes anchored to it and the smoothing of the softened plastics material over the wire, the groove being then closed and the outside surface of the sleeve smoothed.

By being forced into the back of the grooved the wire may assume a position tangential to the inside surface of the sleeve previously fitted over a core. Thus the intrinsic properties of the wire are used to integrate it into the sleeve.

The advantages obtained with this invention are many. First of all the wire is positioned near the inside surface of the sleeve and can even be tangential to this surface, enabling quality welding at the contacting surfaces of the jointed elements. In this case the depth of the groove is similar to the thickness of the sleeve.

The wire is fitted precisely by virtue of the specific pitch of the helical groove, which enables homogeneous welding and prevents two sections of wire coming into contact and forming a short-circuit during welding.

The heated wire is anchored into the plastics material during winding and totally coated after smoothing of the material by virtue of the in-depth melting of the latter. The wire is therefore placed very accurately and cannot move before or after any overmolding. A reliable sleeve is obtained.

The problems of undertensioning or overtensioning the wire are eliminated because its positioning and anchoring are assisted by heating it beforehand.

Also, thanks to the invention, the risks of contamination or soiling of the sleeve in storage are eliminated.

As mentioned above, the in-depth anchoring of the resistive wire enables electric resistance welding sleeves to be produced which do not require systematic overmolding. When overmolding is not required the sleeve is molded directly with parts constituting the connecting terminals.

Finally, the method in accordance with the invention also makes it possible to fabricate electric resistance welding sleeves of varying diameter, for example sleeves for jointing two different diameter pipes.

The invention is also concerned with a device for implementing this method and preferred applications of the resulting sleeve.

The device for implementing the method in accordance with the invention comprises a motor-driven drive system for rotating the sleeve, a head for heating the wire located outside the sleeve and provided with a cutting stylus, said head being guided in translation by a translation drive device driven by the same motor and supplied with wire by a motor-driven wire feed device.

The invention is described in more detail hereinafter with reference to drawings showing a single embodiment.

DETAILED DESCRIPTION OF THE INVENTION

Figure 1:
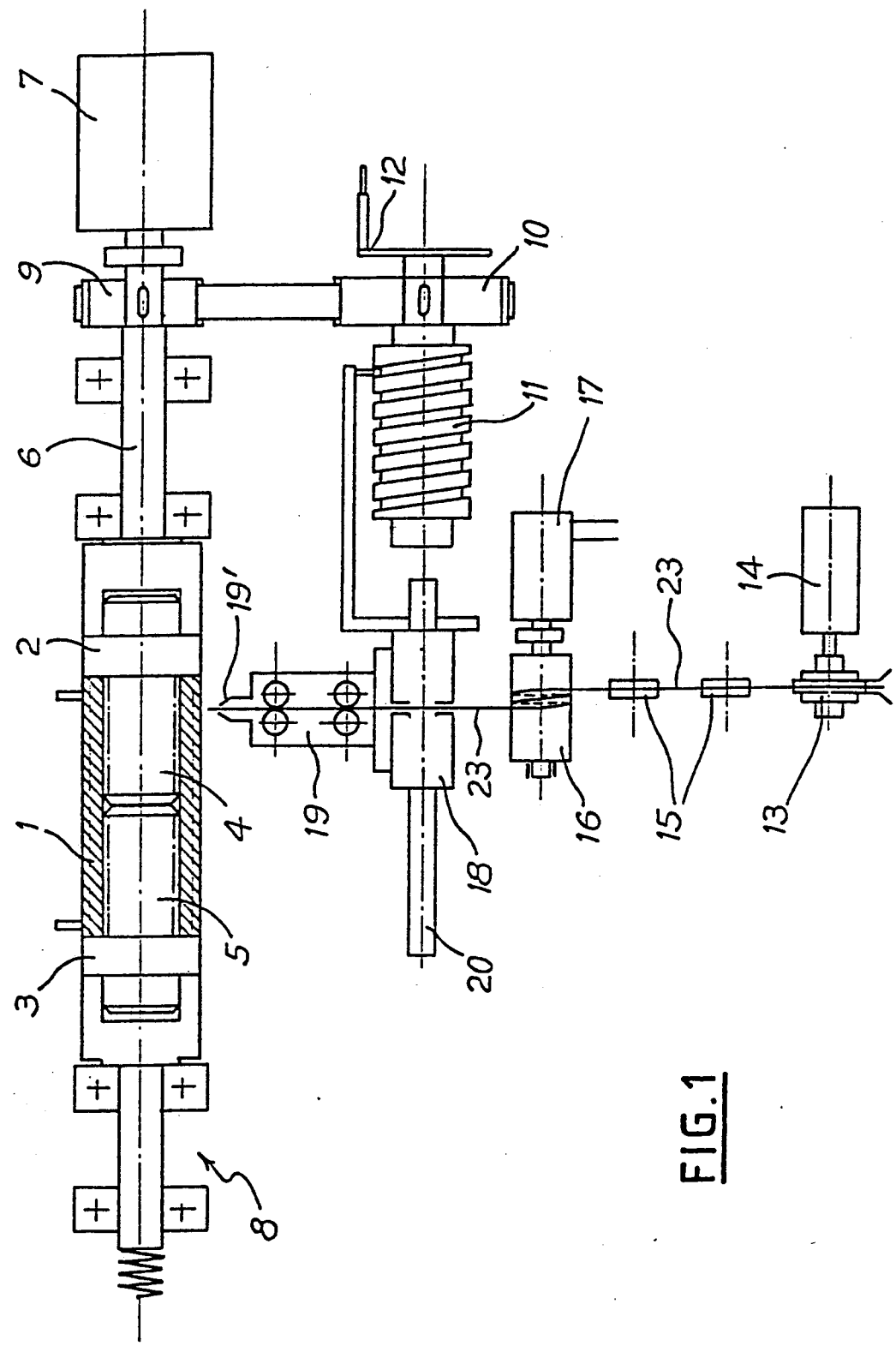
FIG. 1 shows a schematic view of the device for implementing the process.

FIG. 1 shows a device for implementing the method already described.

The molded, preferably injection-molded, sleeve is fitted between two centering members, a drive centering member 2 with claws and an idler centering member 3. Each of these centering members comprises an expandable core, the core 4 being mounted through the centering member 2 and the core 5 being mounted through the centering member 3. The drive centering member 2 is rotationally coupled by a clawed linkage to the end of a shaft 6 supported on bearings, specifically ball bearings, and the other end of the shaft 6 is rotationally coupled to a drive motor 7. The idler centering member 3 is mounted on a retractable tailstock 8 also supported on rotation bearings, specifically ball bearings.

The end of the shaft 6 coupled to the drive motor 7 carries a toothed pulley wheel 9 coupled by a belt to another toothed pulley wheel 10 mounted on and rotationally coupled to the translation guidance device 11. The translation drive device 11 preferably comprises a cylinder with a peripheral helical groove forming a fixed pitch cam. The cylinder 11 is carried by a shaft fixed rotationally to the toothed pulley wheel 10 and a revolution counter wheel 12 is fixed to the end of this shaft extending beyond the pulley wheel 10.

The wire feed device comprises a pay-out unit 13 driven by a motor 14 H. The wire is passed over two rollers 15 to form a slack run and is then wound onto a tensioning drum 16 coupled to an adjustable brake 17. The wire is then inserted into a heating head 19 mounted on a carriage 18. The carriage 18 slides on a shaft 20 fixed in rotation. Translation of the carriage 18 on the shaft 20 is commanded by a system of arms and guide tenons cooperating with the helical groove of the cam 11.

The sleeve is first placed on the cores 5 and 4 of the centering members 2 and 3 which are fixed to the drive headstock and to the retractable tailstock 8. The depth of the groove is adjusted by translation of the head 19 which starts the cutting of the groove, which is preferably triangular in cross-section, by the cutting stylus 19' of the heating head 19; the motors 7 and 14 are operated so as simultaneously to rotate the sleeve 1, translate the head 19 and feed wire.

The device may be adapted to any type of sleeve by sets of centering members and cams appropriate to the various types of sleeve to be produced.

It is also possible to operate on sleeves of varying diameter by using different diameter cores and appropriately controlling the displacement of the heating head 19.

Figure 2:
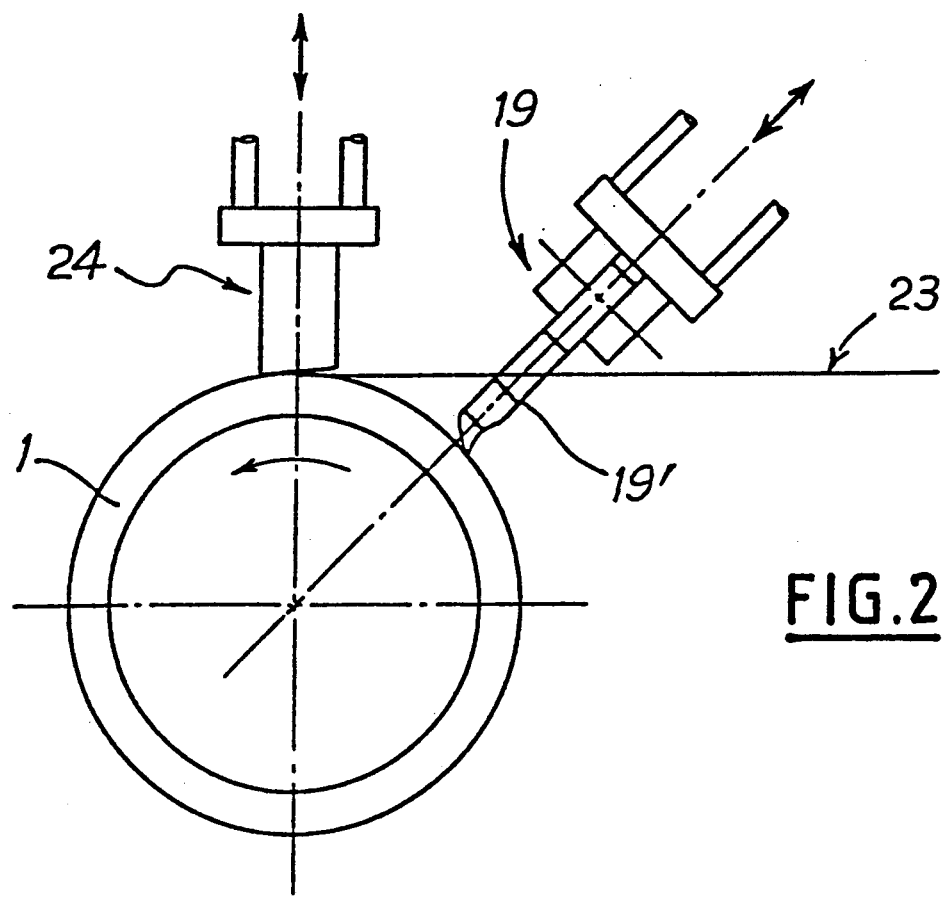
FIG. 2 shows an embodiment of the cutting stylus and of the device for smoothing the plastics material, seen transversely relative to the sleeve.
Figure 3:
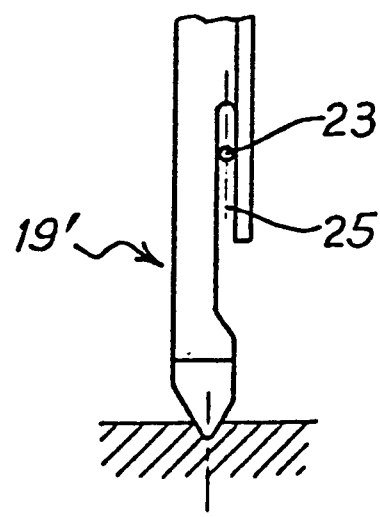
FIG. 3 is a side view of the cutting stylus to a larger scale.

FIGS. 2 and 3 show in more detail an embodiment of the cutting stylus 19' and of a device 24 for smoothing the softened plastics material.

The cutting stylus 19' is radially disposed at approximately 45° to the radial direction of the device 24. The heated wire 23 is stretched tangentially at the top point of the sleeve 1, where the device 24 for smoothing the softened material is disposed.

The wire 23 is guided by a slot 25 provided in the cutting stylus 19' so as to remain aligned with the radial direction of the groove already formed by the cutting stylus 19'.

The device 24 for smoothing the softened plastics material is a retractable PTFE skid.

The skid 24 and the cutting stylus 19' are movable radially in longitudinal translation as shown by the double-headed arrows in FIG. 2 so that they can be retracted and so that they can be adjusted.

It is equally possible to implement the method in accordance with the invention with no skid 24. The material can smooth of its own accord to close the groove by virtue of its intrinsic properties ("shape memory" and plasticity).

Figure 4:
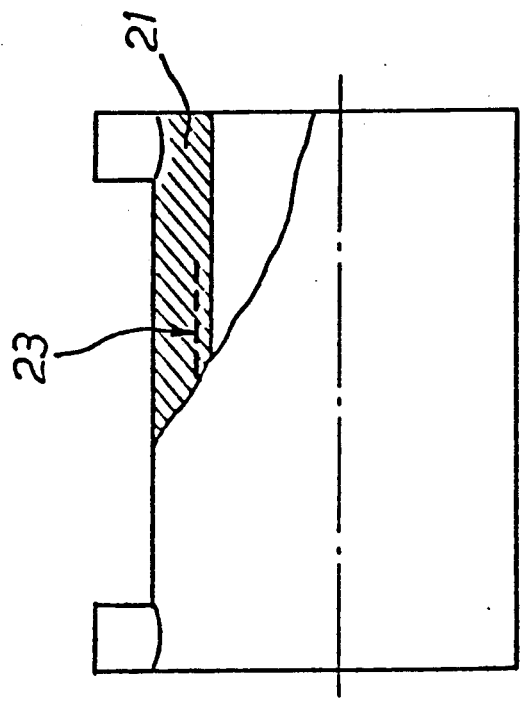
FIG. 4 shows a molded sleeve before the method in accordance with the invention is applied.

FIG. 4 shows a sleeve before the heating wire is fitted. This sleeve is designed to be used on its own, with no overmolded part.

It comprises a relatively thick hollow cylinder 21 and two protruding parts 22 intended to form connecting terminals.

Figure 5:
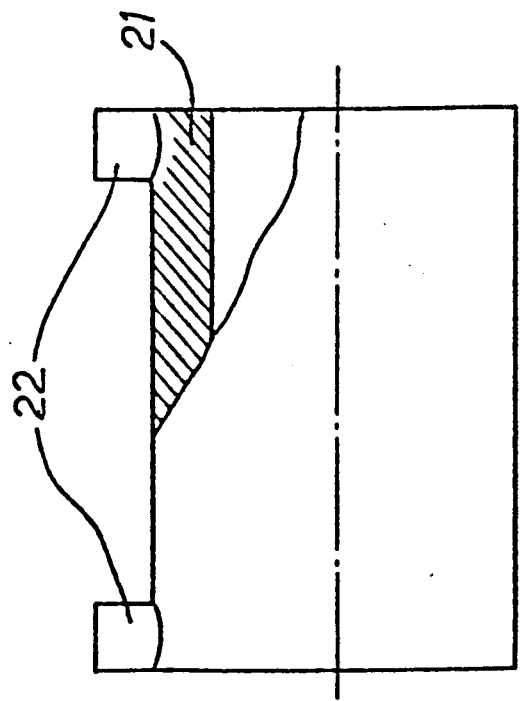
FIG. 5 shows an electric resistance welding sleeve obtained by means of the method in accordance with the invention.

FIG. 5 shows the same sleeve fitted with its heating wire 23 by use of the method in accordance with the invention. The wire 23 is near the inside surface of the cylinder 21 and the depth of the groove formed by the device described above can be adjusted so that it is flush with this inside surface.

This type of sleeve is more particularly intended as an ordinary sleeve, in particular for welding water pipes.

The method in accordance with the invention and the device for implementing it may also be used to form sleeves to be used as electric resistance welding inserts, the outer part of the connector being formed by overmolding around this insert.

This type of sleeve is particularly intended for producing electric resistance welding connectors for gas pipes.

There is claimed:

1. A method of manufacturing a plastics material sleeve fitted with a heating wire for producing an electric resistance welding connector, said sleeve being molded for forming a hollow cylinder having an outer surface and an inner surface spaced apart from one another by a thickness of plastics material, said method comprising the steps of:

disposing said cylinder onto rotation means for rotating said cylinder around its longitudinal axis;

introducing a cutting stylus from the outer surface of said cylinder to the inner surface of said cylinder for forming a helical groove on the outer surface of said cylinder, said helical groove having a depth substantially equal to said thickness of plastics material, said cutting stylus being driven by a translation guidance device operatively connected to said rotation means;

stretching a wire, heated by heating means, tangentially at a point on the outer surface of said cylinder;

guiding said heated wire by means of guiding provided in said cutting stylus for introducing said heated wire in the bottom of the helical groove so that said wire assumes a position substantially tangential to the inner surface of said cylinder;

wherein said steps of forming a helical groove and introducing a heated wire into said helical groove are carried out substantially simultaneously.

2. The method according to claim 1, further comprising a step of covering said heated wire with plastics material by pressing a skid onto the helical groove immediately after the heated wire is introduced into the helical groove.

3. The method according to claim 1, wherein said helical groove is formed with a triangular cross-section.

* * * * *

UNITED STATES PATENT AND TRADEMARK OFFICE
CERTIFICATE OF CORRECTION

PATENT NO. : 5,140,137
DATED : August 18, 1992
INVENTOR(S) : VINCENT B. D'AURIA It is certified that error appears in the above-identified patent and that said Letters Patent is hereby corrected as shown below:

Claim 1, column 6, line 32 delete "for forming" and substitute therefor ---to form---; claim 1, column 6, line 43, delete "in" and substitute therefor ---into---

Signed and Sealed this

Twelfth Day of October, 1993

*Attest:*

BRUCE LEHMAN

*Attesting Officer*    Commissioner of Patents and Trademarks